EXTINCTION CURVE OF THE STANDARD PREPARATION
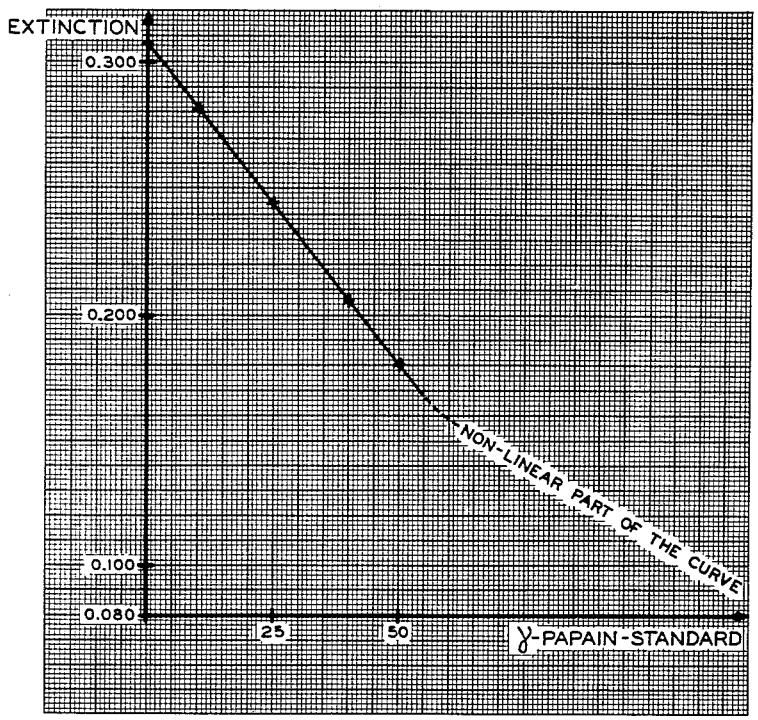

2,950,227
Patented Aug. 23, 1960

2,950,227

FERMENTS OF THE PAPAIN TYPE AND PROCESS OF MAKING SAME

Heinz Gibian, Berlin-Zehlendorf, and Gerhard Bratfisch, Berlin-Frohnau, Germany, assignors to Schering A.G., Berlin, Germany, a corporation of Germany Filed June 5, 1959, Ser. No. 818,482

15 Claims. (Cl. 195—66)

This invention relates to highly purified proteolytic ferments and to novel methods for their preparation. More particularly the invention relates to improved methods for the preparation of purified papain and papain-like ferments from crude papains, said purified products possessing good solubility in water, good temperature stability, and good stability on storage.

This application is a continuation-in-part of our application Serial No. 581,244, filed April 27, 1956, now abandoned.

Proteolytic ferments present in the latex of the tropical tree *Carica papaya* are called papains. The latex of *Ficus carica* and of other tropical trees of the genus Ficus contains ferments which are similar to papain. Such ferments are called ficin. The dried latex of such plants is marketed as crude papain or, respectively, crude ficin. The ferments are present in such products partly in a highly active form, partly in a reversibly inactive form. The inactive component of such crude products can be activated by the addition of a suitable activator. Such activators are, for instance, sodium bisulfite or potassium cyanide.

Commercial papain or papain-like preparations are evaluated by means of test methods such as the Willstaetter test or by a viscosimetric method in which the reduction of the viscosity of a gelatin solution by the addition of papain or papain-like ferments is made use of in a similar manner as in the viscosity reduction test suggested by H. Gibian in "Zeitschrift fuer Physiologische Chemie," vol. 289, pages 1 to 5 (1951), for determining hyaluronidase.

Preparations produced according to the present invention as they are described hereinafter are tested, however, by means of a new test method which is designated as biuret method. The manner in which this biuret test method is carried out will be described in detail hereinafter.

This new biuret test method makes use of the known determination of proteins by means of the biuret reagent as it is described by G. Beisenherz et al. in "Zeitschrift fuer Naturforschung," vol. 8b, page 576 (1953). The method is based on a colorimetric determination of casein which remains unhydrolyzed after subjecting a predetermined amount of casein under predetermined conditions to the action of the papain preparation to be tested. This biuret method, when applied to a specific papain preparation, showed satisfactory agreement with the results obtained on testing the same papain preparation according to other methods. It has the advantage that the results obtained thereby can be reproduced with much greater accuracy than when working according to such other known methods.

Heretofore, all attempts to produce papain of important solubility and of sufficient stability and high activity have failed.

It is known that crude papain contains water insoluble impurities in addition to the water soluble papain. Thus, all the active components of such crude papain can be separated therefrom by extraction by means of water. It is known that when storing fresh crude papain for a prolonged period of time or when heating such crude papain to a temperature of 100° C. or when exposing such crude papain to the action of air for a prolonged period of time, the content of active ferments which can be extracted by means of water, decreases very considerably after a comparatively short period of time. For instance, when storing for 30 days crude papain, the papain content from which immediately after its preparation 2000 units per mg. could be gained by extraction with 10 times its amount of water and by testing the resulting aqueous extract according to the biuret method, it was found that from such a stored crude papain only 1200 units per mg. could be gained by extraction with water and testing in the same manner after a storage period of 30 days, i.e., only about 60% of its initial quantity.

It is one object of the present invention to provide a method of extracting papain from crude papain whereby, even after prolonged storage of the crude papain, substantially the same amounts of ferment are extracted as from freshly prepared crude papain.

Another object of the present invention is to provide a new and effective process of fractionally precipitating the ferment from its aqueous solutions whereby not only the purity of the resulting precipitated papain fraction is considerably increased but also a papain product is obtained which is completely water soluble and forms a clear, non-opalescent solution.

A further object of the present invention is to provide a simple and effective process of working up such clear aqueous solution to dry ferment preparations which are not only of surprisingly high activity but which also retain their high activity for a prolonged period of time, even at elevated temperature.

Still another object of the present invention is to provide a papain-ferment preparation of a high degree of purity, and clearly soluble in water, and stable for at least 14 days at a temperature of about 56° C.

Other objects of the present invention and advantageous features thereof will become apparent as the description proceeds.

The present invention is based upon the observation that the decrease in activity on storing crude papain is only an apparent one and not a permanent one and is due to a decrease in water solubility of papain in the stored crude product. Said decrease in water solubility and, as a result thereof, in extractability has not yet been fully clarified. In contrast to crude papain, papain preparations, according to the present invention which are soluble in water do not show a decrease in activity on storage. The theory is advanced without however, limiting the present invention thereto, that, on storage, there might take place reactions of a chemical or other nature such as cross-linking and the like between part of the ferment and its water-insoluble accompanying substances and that such reactions render water-insoluble part of the ferment.

The term papainases as used herein, is to be understood as including proteolytic ferments of the papain type, and embraces such examples as papains from *Carica papaya*, ficin from figs, bromelin from bananas, and the like. In accordance with the invention there are obtained highly purified ferment preparations which exhibit particularly good water solubility in comparison with previously known preparations, as well as good temperature stability and good stability on storage.

According to the present invention such a decrease in activity corresponding to the above mentioned decrease, surprisingly, does not take place when using for extraction of the ferment from crude papain or, respectively, crude ficin and other crude papain-like ferment preparations, in place of water, an aqueous solution containing a thiocyanate. Especially suitable has proved to be an aqueous molar potassium thiocyanate solution. Extracts obtained with such an aqueous thiocyanate solution contain the same amount of ferment as the crude starting material before storage for 30 days. For the purposes of thiocyanate extraction there may be used aqueous solutions of water soluble metal thiocyanates, especially alkali metal thiocyanates, such as potassium, sodium, or ammonium thiocyanates, and also calcium thiocyanate in concentrations which preferably are between about 0.1 and 1.0 molar. The use of higher concentrations does not produce any notably greater effect, while the use of lower concentrations diminishes the dependability of the extraction. Extraction with aqueous thiocyanate solution is carried out at room temperature or at slightly increased temperature. Care must be taken that a temperature of about 50° C., whereby inactivation of the ferment may occur, is not exceeded. This advantageous result of the use of aqueous thiocyanate solutions for extracting papain from crude papain is not due to an activating effect as produced, for instance, by the addition of sodium bisulfite or potassium cyanide.

The use of aqueous thiocyanate solutions thus represents an important advance in the art of producing pure papain, since it results in a remarkable increase in yield especially when working up crude products which have been stored for some time.

According to another embodiment of the present invention, the effect on yield of the thiocyanate extraction step can be substantially increased by adding heavy metal ions, such as for example, zinc or cadmium ions, to the extract, followed by dialysis of the solution thus obtained. The amount of the zinc or cadmium ions to be added is determined in accordance with the amount of crude papainase to be treated. Thus, for example, in the case of a 10–30% crude papainase extraction (percent based upon the amount of crude papainase added) it is advantageous to employ a zinc or cadmium ion concentration of between about 0.15 and 0.6 molar. The molarity is therefore related to the volume of the extract. Zinc or cadmium ion concentrations below 0.15 molar lead to incomplete reactions, while concentrations above about 0.6 molar can be used successfully and produce favorable results, but are unnecessary since concentrations of 0.6 molar achieve the desired results. If the crude papainase extracts to be treated have a concentration of about 1% to 5%, for example, a zinc or cadmium ion concentration of 0.1 molar gives satisfactory results.

Any suitable water soluble heavy metal salt may be employed which includes a suitable cation. Thus, for example, the zinc or cadmium ions may be added in the form of zinc or cadmium acetate or citrate, and the chlorides of these metals may also be employed.

The pH value of the extract is preferably adjusted to about 4 prior to dialysis. The pH adjustment of the reaction solution can be carried by means of the acids customarily used for this purpose, such as, for example, hydrochloric acid, sulfuric acid, citric acid, or acetic acid, and the like, but we prefer to use acetic acid.

Following the treatment with zinc or cadmium ions and the pH adjustment, the reaction solution is subjected to dialysis against flowing water in accordance with conventional procedures. The solution is then clarified by centrifuging, and may be further subjected to either freeze drying or spray drying to obtain the purified product. By proceeding in this manner, products containing about 4000 units per mg. can be readily prepared.

The novel step of treatment with zinc or cadmium ions has been found to be applicable to crude papain extracts generally, regardless of how originally obtained, as well as to extracts obtained by thiocyanate extraction. Thus, even an aqueous extract of crude papain, made with distilled water, can be extensively purified by treatment with zinc or cadmium ions, followed by dialysis.

To further purify crude papain and papain-like products, the method of fractional precipitation of the ferment from its aqueous solutions by means of ethanol, has been employed heretofore. However, no appreciable increase in purity was achieved thereby. Most of such preparations were not even completely and clearly soluble in water.

According to still another embodiment of the present invention, the purification effect of said method can be increased very substantially by carrying out fractional precipitation by the addition of alcohol in the presence of heavy metal ions. Zinc ions have proved to be especially effective. When proceeding in this manner, products containing 5000 to 6000 units per mg. can readily be prepared. Precipitation by means of alcohol is preferably effected by using a rather concentrated aqueous solution of the ferment, for instance, of papain. Solutions containing up to about 30% of the ferment can readily be employed. The presence of thiocyanate ions has no unfavorable effect upon the fractional precipitation by means of alcohol in the presence of heavy metal ions. It is of advantage to adjust the aqueous solution to a pH of about 6.5. It is remarkable that the presence of heavy metal ions during fractional precipitation not only increases the purification effect but also changes the course of fractionation in comparison to fractionation by means of pure ethanol without heavy metal ions in such a manner that, in the presence of, for instance, zinc ions, fractions of a lower degree of purity are first precipitated while, in the absence of such zinc ions, they are precipitated as the last fraction.

Preferably, the precipitates are removed by centrifuging at a low temperature. To remove excess metal ions and other low molecular admixtures, the precipitated fractions are suspended in dilute acetic acid and are dialyzed against running water. Thereby, a further advantage of the addition of heavy metal ions during alcohol precipitation is achieved. The presence of such heavy metal ions protects the precipitated fractions against losses on subsequent dialysis which mainly serves to remove low molecular impurities present in the crude ferments. Precipitates obtained by the addition of alcohol in the absence of heavy metals lose about half of the ferment units present therein on subsequent dialysis. In contrast thereto, when dialyzing alcohol precipitates obtained in the presence of heavy metal ions, such a loss does not take place. The precipitated ferment fractions are gradually dissolved during dialysis and only small amounts remain undissolved and can readily be filtered off. Thus, finally a clear, non-opalescent, not too dilute ferment solution, i.e., an up to about 20% ferment solution is obtained which can be subjected, without difficulty, to sterile filtration, for instance, through a Seitz filter whereby nitrogen is used as gaseous pressure agent. Thus, the heretofore conventionally used method of sterilizing papain by heating, in the dry state, to 100° C. for one hour is eliminated and the considerable losses in activity due to such heating are avoided. Heretofore, such heat sterilization of papain could not be avoided because the strongly opalescent aqueous solutions of preparations precipitated by means of ethanol alone could be filtered through a Seitz filter only with great difficulty.

The pH value of the fermenting solution during fractional precipitation with ethanol is between about 6.0 and about 7.5 and, as stated hereinbefore, is preferably about 6.5.

The temperature during alcohol precipitation and advantageously also during centrifuging should not substantially exceed 0° C. and is between about −20° C. and about −1° C. A temperature of −8° C. has proved to be especially advantageous.

It is, of course, also possible to collect a greater number of ferment fractions than a fraction precipitated with 50% ethanol and a fraction precipitated with 80% ethanol, as described in Example 8, below. For instance, fractions precipitated with 40% ethanol, with 60% ethanol, and with 80% ethanol or the like, may be obtained. Satisfactory results, however, are obtained when proceeding as described in Example 8.

Aqueous papain solutions sterilized by filtration, as they are obtained according to the present invention, can subsequently be subjected to deep freeze drying without any loss in activity. Thereby dry ferment preparations are obtained which form clear solutions in three times their amount of distilled water. Such preparations exhibit without the addition of an activator 60% of the activity found on addition of an activator such as sodium bisulfite. Such preparations retain their activity at room temperature for a very long time and at 56° C. for at least 14 days.

The following examples serve to illustrate the present invention without, however, limiting the same thereto.

EXAMPLE 1

30 g. of crude papain (containing 1,200 biuret units per mg., corresponding to 36 mega units per 30 g.) assayed in accordance with the procedure described below, are extracted with 100 cc. of an 0.2 molar potassium thiocyanate solution at 30° C. for 30 minutes. The solution is then centrifuged for 10 minutes at about 5000 times the acceleration of gravity ($g$).

Yield at this stage amounts to 105 cc. containing 325,000 units per cc., thus totaling 34 mega units. The supernatant opalescent solution is separated and 9.6 g. of zinc acetate (with 2 mols of water) are added with stirring, so that a solution is obtained which is of 0.4 molar concentration of zinc ions. Thereupon the pH value of this solution is adjusted to 4.0 The thus obtained turbid, strongly opalescent liquid is dialyzed against running water without previous clarification and the precipitate thus formed is filtered off. The solution thus obtained is optically clear and is finally freeze-dried. The yield amounts to 7 g. containing 3900 units per mg., corresponding to about 27 mega units (75%).

EXAMPLE 2

30 g. of crude papain (containing 1,200 biuret units per mg., corresponding to 36 meta units per 30 g.) are extracted with 100 cc. of a 0.4 molar potassium thiocyanate solution at 30° C. for 60 minutes. The solution is then centrifuged at about 5000 times $g$ for 10 minutes.

The yield at this stage amounts to 115 cc. containing 300,000 units per cc., thus totaling 34.5 mega units. The supernatant opalescent solution is separated and 19.2 g. of zinc acetate (with 2 mols of water) are added with stirring, so that a solution is obtained which is 0.8 molar with respect to zinc ions. Then the pH value of this solution is adjusted to 4.5 with acetate. The thus obtained turbid, strongly opalescent solution is dialyzed against running water without previous clarification and the precipitate thereby formed is filtered off. The solution thus obtained is optically clear and is finally freeze-dried. The yield amounts to 7 g. containing 4,000 units per mg., corresponding to 28 mega units (78%).

EXAMPLE 3

30 g. of crude papain (containing 1,200 biuret units per mg., corresponding to 36 mega units per 30 g.) are extracted with 100 cc. of a 1.0 molar potassium thiocyanate solution at 37° C. for 20 minutes. The solution is then centrifuged at about 5000 times $g$ for 10 minutes.

The yield at this stage amounts to 100 cc. containing 340,000 units per cc., thus totaling 34 mega units. The supernatant opalescent solution is separated and 12.4 g. cadmium acetate (with 2 mols water) are added with stirring, so that a solution is obtained which is 0.4 molar in respect to cadmium ions. Thereupon the pH value of this solution is adjusted to 4.2 with acetic acid. The thus obtained turbid, strongly opalescent solution is dialyzed against running water without previous clarification and the precipitate thus formed is filtered off. The solution thus obtained is optically clear and is freeze-dried. The yield amounts to 7.5 g. containing 3900 units per mg., corresponding to 29 mega units (80%).

EXAMPLE 4

30 g. of crude papain (containing 1400 biuret units per mg., corresponding to 42 mega units per 30 g.) are extracted with 100 cc. of a 0.1 molar potassium thiocyanate solution at 20° C. for 60 minutes. The solution is then centrifuged at about 5000 times $g$ for 10 minutes.

The yield at this stage amounts to 105 cc. containing 380,000 units per cc., thus totaling 40 mega units. The supernatant opalescent solution is separated and 4.8 g. of zinc acetate (with 2 mols water) is added with stirring, so that a solution is obtained which is 0.2 molar in respect to zinc ions. Thereupon the pH value of this solution is adjusted to 4.3 with acetic acid. The thus obtained turbid, strongly opalescent solution is dialyzed against running water without previous clarification and the precipitate thereby formed is centrifuged off. The solution thus obtained is optically clear and is finally freeze-dried. The yield amounts to 7.1 g. containing 4200 units per mg., corresponding to 30 mega units (71%).

EXAMPLE 5

90 g. of crude ficin (containing 1500 biuret units per mg., corresponding to 135 mega units per 90 g.) are extracted with 300 cc. of a 0.6 molar potassium thiocyanate solution at 30° C. for 30 minutes. The solution is then centrifuged at about 5000 times $g$ for 10 minutes.

The yield at this stage amounts to 320 cc. containing 380,000 units per cc., thus totaling 121 mega units. The supernatant opalescent solution is separated and 30 g. of zinc acetate (with 2 mols water) are added with stirring, so that a solution is obtained which is 0.4 molar in respect to zinc ions. Thereupon the pH value of this solution is adjusted to 4.4 with acetic acid. The thus obtained turbid, strongly opalescent solution is dialyzed against running water without previous clarification. The solution thus obtained is optically clear and is finally freeze-dried. The yield amounts to 25 g. containing 4000 units per mg., corresponding to 100 mega units (74%).

EXAMPLE 6

60 g. of crude bromelin (containing 800 biuret units per mg., corresponding to 48 mega units per 60 g.) are extracted with 200 cc. of a 0.3 molar potassium thiocyanate solution at 25° C. for 25 minutes. The solution is then centrifuged at about 5000 times $g$ for 10 minutes.

The yield at this stage amounts to 235 cc. containing 190,000 units per cc., thus totaling 45 mega units. The supernatant opalescent solution is separated and 14.4 g. of zinc acetate (with 2 mols water) are added with stirring, so that a solution is obtained which is 0.6 molar in respect to zinc ions. Thereupon the pH value of this solution is adjusted to 4.0 with acetic acid. The thus obtained turbid, strongly opalescent solution is dialyzed against running water without previous clarification. The precipitate thus formed is filtered off. The solution thus obtained is optically clear and is finally freeze-dried. The yield amounts to 10.2 g. containing 3500 units per mg., corresponding to 35.5 mega units (74%).

EXAMPLE 7

30 g. of crude papain (containing 1200 biuret units per mg., corresponding to 36 mega units per 30 g.) are extracted with 100 cc. of distilled water at 25° C. for 40 minutes. The solution is then centrifuged at about 5000 times $g$ for 10 minutes.

The yield at this stage amounts to 105 cc. containing 260,000 units per cc., thus totaling 27 mega units (25% loss). The supernatant opalescent solution is separated and 9.6 g. of zinc acetate (with 2 mols water) are added with stirring, so that a solution is obtained which is 0.4 molar in respect to zinc ions. Thereupon the pH value of this solution is adjusted to 4.2 with acetic acid. The thus obtained turbid strongly opalescent solution is dialyzed against running water without previous clarification. The precipitate thus formed is centrifuged off. The solution thus obtained is optically inactive and is finally freeze-dried. The yield amounts to 7.5 g. containing 3900 units per mg., corresponding to 22 mega units (61%).

EXAMPLE 8

30 g. of crude papain containing 1500 biuret units/mg. (corresponding to 45 mega units per 30 g.) are stirred with 100 cc. of a molar potassium thiocyanate solution at 30° C. for 30 minutes. To facilitate separation of the solution from undissolved matter, about 10 g. of kieselguhr, washed with distilled water, are added to the mixture while stirring. The resulting paste is filtered off by suction over a layer of kieselguhr and the filter residue is washed with 10 cc. of distilled water. 105 cc. of filtrate containing 410,000 units/cc. (corresponding to 43 mega units) are obtained.

4.6 g. of zinc acetate ($Zn(C_2H_3O_2)_2+2H_2O$) are added to the resulting clear solution while stirring. The amount of zinc acetate added corresponds to 0.2 mole. Thereby, a precipitate is formed which is not removed. The pH of the resulting suspension is adjusted to a pH of 6.5 by the addition of sodium hydroxide. Ethanol is gradually and slowly added, drop by drop, to said suspension at a temperature decreasing from 0° C. to −8° C. until the ethanol concentration of the mixture is 50%. The precipitate is removed by centrifuging at a temperature of −8° C. It is then suspended in 2 N acetic acid, and dialyzed against running water overnight.

60 cc. of a solution of the first fraction precipitating within the range of 0–50% ethanol are obtained. This fraction contains 200,000 units/cc. corresponding to about 12 mega units.

The clear filtrate from the first fraction precipitate is subjected to further precipitation by the drop-wise addition of ethanol at a temperature of −8° C. until the ethanol concentration of the mixture amounts to 80%. The resulting precipitate is worked up in the same manner as described hereinabove for the first fraction.

On dialysis of the acetic acid suspension of said second fraction, 65 cc. of solution are obtained. Said solution contains 380,000 units/cc. corresponding to 25 mega units.

Both sections are filtered through a Seitz filter under nitrogen pressure without any loss in activity. The resulting sterile filtrates are subjected to deep freeze drying. Thereby, the following products are obtained.

First fraction: 0–50% ethanol, 4 g. (3000 units/mg.) =12 mega units.
Second fraction: 50–80% ethanol, 5 g. (5000 units/mg.) =25 mega units.
Total yield: 37 mega units, corresponding to 82% of the initial papain content of the starting material.

In carrying out the foregoing process other starting materials containing papain and papain-like ferments than crude papain may be used, and fractional precipitation of the ferment by ethanol may be brought about at a pH other than a pH of 6.5, separation of the precipitated ferment fractions by other means than centrifuging may be employed, and other changes and variations may be made.

The biuret test for assaying papain is carried out in the following manner.

(1) Reagents

*Citrate buffer solution.*—500 cc. of N/5 sodium hydroxide solution are adjusted to a pH of 6.0 by the addition of a 20% citric acid solution. The mixture is made up to 1000 cc. by the addition of distilled water.

*Substrate solution.*—625 mg. of casein prepared according to Hammarsten are dissolved in 50 cc. of N/5 sodium hydroxide solution. The solution is adjusted to a pH of 6.0 by the addition of a 5% citric acid solution, is filtered, if required, and its volume is made up to 100 cc. by the addition of distilled water. The substrate solution which is not used on the day of its preparation is frozen in a refrigerator at a temperature of −20° C. It cannot be stored for more than a week.

*Activator solution.*—Sodium bisulfite is dissolved in the above described citrate buffer solution in an amount yielding a bisulfite concentration of 1 mg./cc.

*Biuret reagent.*—9 g. of Seignette salt (sodium potassium tartrate) are dissolved in about 400 cc. of N/5 sodium hydroxide solution. 3 g. of finely pulverized analytical grade crystalline copper sulfate and, thereafter, 5 g. of analytical grade potassium iodide are added to said solution. Care must be taken that each of these salts is completely dissolved before the next salt is added. The mixture is made up to 1000 cc. by the addition of N/5 sodium hydroxide solution. The reagent solution is filled into brown bottles provided with an inner silicone layer. The solution can be stored in a refrigerator for a considerable period of time.

*Trichloro acetic acid solution.*—50 g. of trichloro acetic acid are filled up to 100 cc. by the addition of distilled water, thereby yielding an about 3 molar solution.

(2) Procedure

PREPARING THE FERMENT SOLUTION (a) Soluble papain preparations are dissolved in distilled water to yield a solution of a concentration of 1 mg./cc. Such a solution, if required, is further diluted by the addition of distilled water.

(b) Extracts are prepared from insoluble crude papain by extracting 100 mg. of crude papain with 1 cc. of distilled water or with 1 cc. of molar potassium thiocyanate solution. Extraction duration: 30 minutes at 37° C. while frequently stirring with a glass rod. The aqueous extract is diluted with 4 cc. of distilled water and is filtered. If necessary, the filtrate is further diluted by the addition of distilled water.

PROTEOLYSIS OF THE SUBSTRATE 0.8 cc. of substrate solution (corresponding to 5 mg. of casein), 0.1 cc. of activator solution (corresponding to 0.1 mg. of sodium bisulfite), and 0.1 cc. of the solution of the ferment to be tested, are mixed in a centrifuge tube which is placed in a thermostat adjusted to 37° C. for exactly 30 minutes. The action of the ferment is arrested by the addition of 0.2 cc. of trichloro acetic acid solution while shaking.

SEPARATION AND COLORIMETRIC DETERMINATION OF UNCHANGED SUBSTRATE

The non-decomposed casein precipitates and is removed by centrifuging. The solution is poured off. Residual solution adhering to the glass walls is removed by means of filter paper. The casein precipitate is stirred by means of a glass rod and whirled up in 3 cc. of distilled water. 3 cc. of biuret reagent solution are added thereto. After 10 minutes, the solution is colorimetrically determined by using a "WK photo cell colorimeter" according to Havemann and the found extinction value ($\epsilon$) is noted.

REAGENT BLANK VALUE

The blank value of the biuret reagent solution ($\epsilon_0$) is determined by colorimetric determination of a mixture of 3 cc. of distilled water and 3 cc. of biuret reagent solution under the same conditions as described above. The resulting extinction value $\epsilon_0$ is deducted from the above determined extinction value $\epsilon$.

All tubes and pipettes must be carefully cleaned by means of chromosulfuric acid before each use.

The difference $\epsilon - \epsilon_0 = \epsilon_c$, determined in this manner, corresponds to the unreacted casein. Its amount serves as measure for the activity of the tested papain. It is, of course, understood that said value must always be lower than the extinction value found when subjecting the initially used casein to exactly the same conditions without the addition of ferment (initial value). Said value is the lower, the higher the activity of the tested ferment.

To clarify the relationship between $\epsilon_c$ and the activity of the ferment, it is necessary to define said activity more exactly. As it is customary in biological assays and tests, the activity of a ferment preparation determined according to the above described method is compared with the activity of a standard ferment preparation determined by following the same test procedure.

However, no papain standard preparation is internationally acknowledged. Willstaetter used for the evaluation of papain according to his test method an arbitrarily selected papain preparation as comparative standard preparation. Since the original standard preparation of Willstaetter was not avaliable, a specific papain standard preparation was prepared and used in the new biuret test.

(3) *Preparation of the standard papain*

A crude papain commercially available to the trade as "Merck 1:350" was extracted with water. The extract was dialyzed against running water and subjected to freeze drying. The resulting dry product was used as primary standard preparation in carrying out the biuret method. This primary standard preparation was assayed according to Willstaetter's method by using the standard curves published by Willstaetter (see, for instance, the text book by Bamann-Myrbaeck on "Die Methoden der Fermentforschung," Georg Thieme-Verlag, Leipzig, 1941, vol. 3, page 2946). The preparation had an activity of 0.7 Willstaetter unit/mg. However, for practical reasons, a smaller unit than the Willstaetter unit was used in the new biuret test. Said unit is defined as follows:

"1 mg. of the primary papain standard preparation produced as described hereinabove, has, when carrying out the biuret test under the above established conditions, a proteolytic activity of 1000 biuret units."

There exists no generally applicable numerical relation between Willstaetter units and biuret units because the numerical values found for each assayed crude papain of varying activity and origin are dependent, to a certain extent, on the evaluation technique employed and do not refer to an identical primary standard preparation.

(4) *Evaluation of the test results with respect to the biuret standard preparation*

The extinction value $\epsilon_c$ of the assayed papain sample as found by the biuret method is evaluated by comparing said value with the values of the attached curve diagram (Fig. 1) of the primary papain standard preparation. In said curve diagram, the extinction values are plotted along the ordinate while the amounts of the standard preparation in $\gamma$ are plotted along the abscissa. Each plotted extinction value corresponds to a specific amount of standard preparation in $\gamma$ so that determination of the extinction value $\epsilon_c$ allows to simply read off the coordinated amount of papain standard preparation.

It is necessary to determine the extinction curve, as shown in the attached diagram of Fig. 1, on the same day on which and with the same casein with which the extinction value of the papain sample to be assayed is determined in order to reduce the limit of error. To determine the starting value of the curve, the extinction value of a mixture of 0.8 cc. of substrate solution and 0.2 cc. of citrate buffer solution without addition of ferment and activator is determined in exactly the same manner as described hereinabove under (2). Of course, the papain values in $\gamma$ coordinated to the extinction values found for the papain sample can be read only along the linear part of the curve. If the extinction value of the papain sample is not found on said linear part of the curve, the assay must be repeated with a smaller amount of papain, i.e., by correspondingly diluting the papain solution. The biuret units per mg. of papain sample are calculated by the following equation:

$$\text{Biuret units/mg.} = \frac{\gamma \text{ (as read)} \times 10 \times \text{dilution}}{\text{weighed ferment per cc.}}$$

If necessary, any dilution of the ferment solution must be taken into account.

Although, as stated above, the new biuret method has advantages over the known methods of determining the papain content of a given ferment sample, it is, of course, possible to use such other methods without departing from the principle of the present invention.

We claim:

1. Process of producing highly purified ferments selected from the group consisting of papain, ficin and bromelin from commercially available crude preparations containing such ferments which comprises extracting said crude preparation with an aqueous inorganic thiocyanate solution at a temperature below about 50° C., separating the resulting extract from undissolved matter, and recovering the purified ferments from said extract.

2. Process of producing highly purified ferments selected from the group consisting of papain, ficin and bromelin from commercially available crude preparations containing such ferments which comprises extracting said crude preparation with an aqueous inorganic thiocyanate solution at a temperature below about 50° C., separating the resulting extract from undissolved matter, adding to the extract a heavy metal ion selected from the group consisting of zinc and cadmium ions, and recovering the purified ferment from said extract.

3. Process of producing highly purified ferments selected from the group consisting of papain, ficin and bromelin from commercially available crude preparations containing such ferments which comprises extracting said crude preparation with an aqueous inorganic thiocyanate solution at a temperature below about 50° C., separating the resulting extract from undissolved matter, adding to the extract a heavy metal ion selected from the group consisting of zinc and cadmium ions, dialyzing the extract and recovering the purified ferment therefrom.

4. The process of claim 2 in which the concentration of the heavy metal ion is between about 0.15 and about 0.6 molar.

5. The process of claim 2 in which the crude ferment preparation is a papain preparation.

6. The process of claim 2 in which the crude ferment preparation is a ficin preparation.

7. The process of claim 2 in which the crude ferment preparation is a bromelin preparation.

8. The process of claim 1 in which the thiocyanate is potassium thiocyanate.

9. The process of claim 2 in which the thiocyanate is potassium thiocyanate.

10. In a process of producing highly purified papain, the steps comprising intimately contacting crude papain with an about molar potassium thiocyanate solution at about 30° C., separating the resulting extract from undissolved matter, adding to said extract a water soluble zinc salt, adjusting the pH of the mixture to about 6.5, adding ethanol drop by drop to the mixture at a temperature between 0° C. and about −8° C. until the ethanol concentration of the mixture is about 50%, centrifuging the resulting precipitate, adding further amounts of ethanol drop by drop at a temperature between about 0° C. and about −8° C. to the resulting mother liquor until its ethanol concentration is about 80%, centrifuging the resulting precipitate, suspending the two ferment fractions, each separately, in about 2 N acetic acid, dialyzing the suspensions of said fractions against running water, filtering the resulting ferment fraction solutions through Seitz filters and freeze drying the sterile filtrates obtained thereby.

11. Process of producing highly purified ferments selected from the group consisting of papain, ficin and bromelin from commercially available crude preparations containing such ferments which comprises extracting said crude preparation with an aqueous inorganic thiocyanate solution at a temperature below about 50° C., separating the resulting extract from undissolved matter, adding to the extract a heavy metal ion selected from the group consisting of zinc and cadmium ions, fractionally precipitating the purified ferment by adding to the extract increasing amounts of ethanol at a temperature not substantially greater than 0° C., and recovering the purified ferment.

12. The process of claim 3 in which the diaylsis is carried out against running water.

13. The process of claim 3 in which the pH of the solution is adjusted to about 4 before the dialysis.

14. Process of producing highly purified ferments selected from the group consisting of papain, ficin and bromelin from commercially available crude preparations containing such ferments which comprises extracting said crude preparation with water at a temperature below about 50° C., separating the resulting extract from undissolved matter, adding to the extract a heavy metal ion selected from the group consisting of zinc and cadmium ions, fractionally precipitating the purified ferment by adding to the extract increasing amounts of ethanol at a temperature not substantially greater than 0° C., and recovering the purified ferment.

15. Process of producing highly purified ferments selected from the group consisting of papain, ficin and bromelin from commercially available crude preparations containing such ferments which comprises extracting said crude preparation with water at a temperature below about 50° C., separating the resulting extract from undissolved matter, adding to the extract a heavy metal ion selected from the group consisting of zinc and cadmium ions and recovering the purified ferment.

No references cited.